S. Ayres.
Rain Water Strainer & Cut-off.
N° 94,271. Patented Aug. 31, 1869.
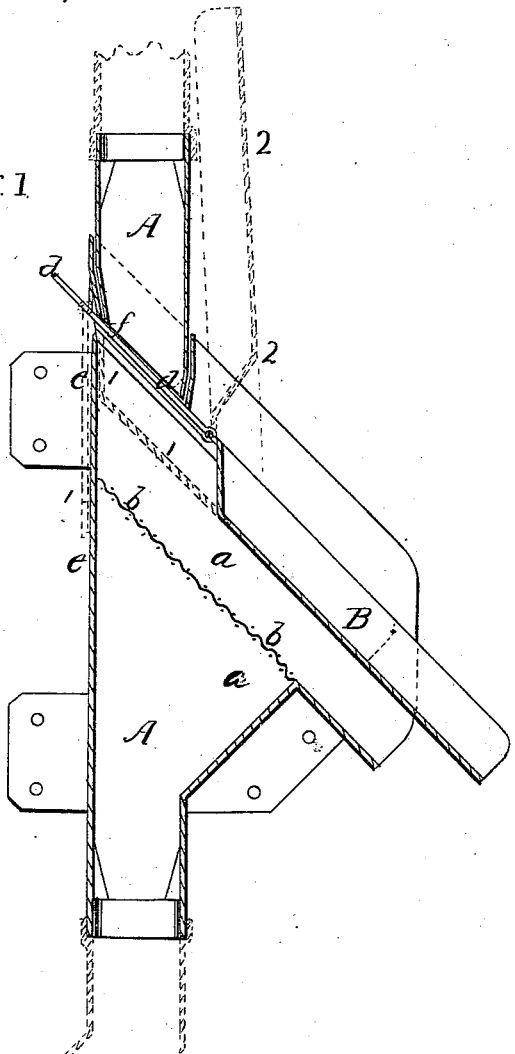
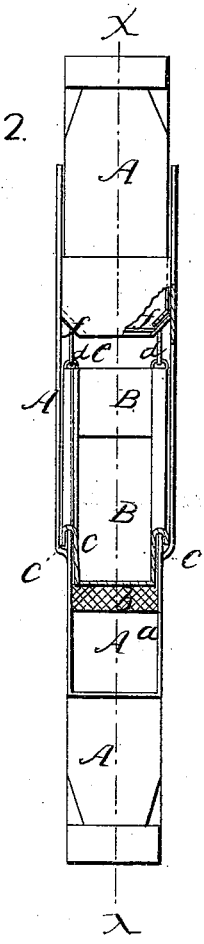
Witnesses:
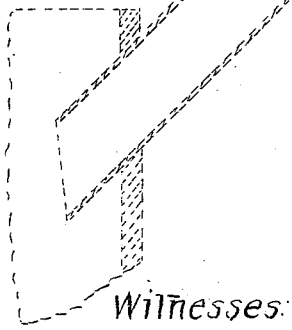
Inventor
S Ayres
per Wmm Ty
Attorneys

United States Patent Office.

SAMUEL AYRES, OF DANVILLE, KENTUCKY.

Letters Patent No. 94,271, dated August 31, 1869.

IMPROVEMENT IN RAIN-WATER STRAINERS AND CUT-OFFS.

The Schedule referred to in these Letters Patent and making part of the same.

*To all whom it may concern:*

Be it known that I, SAMUEL AYRES, of Danville, in the county of Boyle, and State of Kentucky, have invented a new and improved Strainer and Cut-Off for Cisterns; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved strainer and cut-off, the plane of section being indicated by the line $x$ $x$, fig. 2.

Figure 2 is a front view of the same.

Similar letters of reference indicate corresponding parts.

This invention relates to a new apparatus for straining the water running from a roof into a cistern, and for cutting it off when it is to be conducted into a garden or some other place, or to prevent overflowing of the cistern.

The invention consists chiefly in a sliding trough, which can be moved under the water-course, to prevent the water from reaching the cistern, and which may be again moved out of the way to free the passage to the cistern.

The invention also consists in several devices and appliances for preventing leaves and other impurities from clogging the strainer.

A, in the drawing, represents a pipe, arranged between the roof and cistern of a building, on the ordinary rain-water pipe.

The portion A of the said rain-water pipe is by preference made square, with an enlargement, $a$, on one side, as shown.

The enlarged portion $a$ carries a sieve or strainer, $b$, which is or may be inclined as shown, to allow leaves, &c., to find their way out through the open front part of the pipe.

The sieve will arrest all leaves, insects, and other impurities, and will prevent their entering the cistern.

Above the sieve are arranged, on the inner sides of the enlarged part of the pipe A, some inclined rails, $c$, on which the turned-over edges of an inclined trough, B, are suspended.

This trough is held in place by a wire bail, $d$, which is pivoted with its ends to the trough, and is fitted through the closed back $e$ of the pipe A.

When the trough is let down, as in fig. 1, the bail closes against the back $e$ of the pipe.

When the trough is drawn against the back $e$, as shown by red lines, 1 1, in fig. 1, the bail folds down, as shown, and thereby also locks the trough.

The same will in this position catch the water and guide it into a barrel or other receptacle, but prevent it from reaching the cistern.

When the trough is down, to let the strainer work, it can be swung up, as shown by red lines, 2, in fig. 1, to allow the strainer to be cleaned.

To prevent the sides of the bail from becoming clogged by leaves or other impurities, they are protected by inclined flanges $f$ $f$, as shown in fig. 2, said flanges also serving to direct the water to the centre of the pipe.

Having thus described my invention,

I claim as new, and desire to secure by Letters Patent—

1. The combination of the movable trough B, bail $d$, and pipe A, as and for the purpose specified.

2. The construction and arrangement with reference to each other of the bail $d$, pipe A, and flange $f$, for the purpose set forth.

SAMUEL AYRES.

Witnesses:
R. S. RUSSEL,
JONA. B. NICHOLS.